(12) United States Patent
Brown, Jr.

(10) Patent No.: US 12,053,726 B2
(45) Date of Patent: Aug. 6, 2024

(54) MULTI-STAGE FILTER, A FILTRATION SYSTEM CONTAINING SUCH FILTERS, AND METHODS OF USING THE SYSTEMS

(71) Applicant: Richard Spence Brown, Jr., Coraopolis, PA (US)

(72) Inventor: Richard Spence Brown, Jr., Coraopolis, PA (US)

( * ) Notice: Subject to any disclaimer, the term of this patent is extended or adjusted under 35 U.S.C. 154(b) by 52 days.

(21) Appl. No.: 17/533,927

(22) Filed: Nov. 23, 2021

(65) Prior Publication Data
US 2022/0161166 A1 May 26, 2022

Related U.S. Application Data

(60) Provisional application No. 63/117,198, filed on Nov. 23, 2020.

(51) Int. Cl.
*B01D 35/30* (2006.01)

(52) U.S. Cl.
CPC ........ *B01D 35/30* (2013.01); *B01D 2201/302* (2013.01); *B01D 2201/306* (2013.01)

(58) Field of Classification Search
CPC .............. B01D 35/30; B01D 2201/302; B01D 2201/306; B01D 29/13; B01D 29/58
USPC ...... 210/648, 94, 195.1, 252, 256, 258, 315, 210/338, 342, 440–444, 455, 456
See application file for complete search history.

(56) References Cited

U.S. PATENT DOCUMENTS

| | | | | |
|---|---|---|---|---|
| 5,445,734 A * | 8/1995 | Chen | ................... | B01D 29/114 210/450 |
| 6,068,762 A * | 5/2000 | Stone | ..................... | B01D 29/96 210/DIG. 17 |
| 2004/0178150 A1* | 9/2004 | Denton | .............. | B01D 17/0202 210/691 |
| 2014/0021138 A1* | 1/2014 | Osterhoudt | ............ | B01D 61/04 210/259 |

OTHER PUBLICATIONS

"Pentek 10" slim Line Water Filter Housing Blue/Clear No. PR, Fresh Water Systems. Accessed by applicant on Aug. 29, 2022.*
"Hydronix HF3-10CLBK34, 10" Clear Housing with Black Rib Cap For RO & Filtration Systems, 3/4"Ports," Amazon, Accessed on Aug. 29, 2022, https://www.amazon.com/Hydronix-HF3-10CLBK34-Clear-Housing-Black/dp/B01CFOGE3K/ref=sr_1_3?dchild=1&keywords=hydronix+housing&qid=1588089063&sr=8-3.
"Polaris In-Line Filter Assembly," PoolZoom. Accessed on Aug. 29, 2022, https://www.poolzoom.com/in-line-filter-assembly.html?gclid=Cj0KCQjwhZr1BRCLARIsALjRVQMovgcsMC5mBENMdfuez4Ru53RdmEBUgEYYJdbk1Mikm5VIWi-gUvcaAkpXEALw_wcB.

\* cited by examiner

Primary Examiner — Madeline Gonzalez
(74) Attorney, Agent, or Firm — The Webb Law Firm

(57) ABSTRACT

A multi-stage filter for filtering and removing fluids includes (1) a filtering base, and (2) a fluid transfer cap. The filter base includes: (i) a cover; (ii) a second stage filter positioned inside the housing of the cover; and (iii) a first stage filter positioned inside the housing of the second stage filter. The fluid transfer cap attaches to the first end of the cover and includes: (i) a first closed end; (ii) a second end having an opening that is positioned opposite the first end; (iii) an annular skirt that extends between the first and second ends; (iv) an annular shaped barrier member positioned inside and spaced apart from the annular skirt; (v) a fluid inlet comprising an extension member that extends through a side of (Continued)

the annular skirt to the annular shaped barrier member; and
(vi) a fluid outlet.

17 Claims, 3 Drawing Sheets

≠

MULTI-STAGE FILTER, A FILTRATION SYSTEM CONTAINING SUCH FILTERS, AND METHODS OF USING THE SYSTEMS

CROSS REFERENCE TO RELATED APPLICATIONS

This application claims priority to U.S. Provisional Patent Application No. 63/117,198, filed Nov. 23, 2020.

BACKGROUND

Technical Field

The present disclosure relates to a multi-stage filter, a filtration system containing such filters, and methods of using the systems such as for removing and filtering water from covers.

Technical Description

Covers are commonly placed over various areas (e.g. pools and other bodies of waters) and articles (e.g. over boats and cars) to prevent debris and rain water from entering and contacting these areas and articles. However, removing the debris and rain from the covers can be problematic. For example, covers are placed over residential and commercial pools to prevent debris and rain water from entering. When the covers are removed for later use, the water and debris are typically pumped onto the surrounding ground or pumped directly into the skimmer of the main pool filter. While these methods can prevent debris and water from entering the pool when removing the cover, the methods have various drawbacks. For instance, pumping the debris and water into the ground can flood and oversaturate the soil when pumped onto a surrounding yard. Alternatively, pumping the debris and water directly into the skimmer of the main pool filter can clog the filter, which can shorten the lifetime of the filter due to overuse.

Thus, it is desirable to provide an effective alternative for removing debris and water. It is also desirable to filter water for reuse, such as to be incorporated into the pool itself.

SUMMARY

In non-limiting embodiments, provided herein is a multi-stage filter for filtering and removing fluids. The multi-stage filter includes (1) a filtering base, and (2) a fluid transfer cap. The filter base includes: (i) a cover having a first end having an opening, a second closed end opposite the first end, a body portion that extends between the first end and second end, and a housing formed within the body portion; (ii) a second stage filter positioned inside the housing of the cover, the second stage filter having a first end, a second end opposite the first end, a body portion that extends between the first end and second end, and a housing formed within the body portion, the body portion of the second stage filter comprising a plurality of openings; and (iii) a first stage filter positioned inside the housing of the second stage filter, the first stage filter having a body portion comprising a plurality of openings having a size that is larger than the size of the openings of the second stage filter. The fluid transfer cap attaches to the first end of the cover of the filter base. Further, the fluid transfer cap includes: (i) a first closed end; (ii) a second end having an opening that is positioned opposite the first end; (iii) an annular skirt that extends between the first and second ends; (iv) an annular shaped barrier member positioned inside the annular skirt and spaced apart from the annular skirt, the annular shaped barrier member comprising a housing and an outlet located at an end opposite the first end of the cap; (v) a fluid inlet comprising (a) an extension member that extends through a side of the annular skirt to the annular shaped barrier member, and (b) an open channel formed through the extension to allow fluids to flow into the housing of the annular shaped barrier member; and (vi) a fluid outlet that receives and distributes filtered water from the housing of the cover. When the cap is attached to the base of the device, the annular shaped barrier member extends into the housing of the first stage filter, and the first stage filter and second stage filter engage the base and fluid transfer cap so water flows through the plurality of openings of the first and second stage filters to the fluid outlet.

In non-limiting embodiments, the outer surface of the annular shaped barrier member can have an engagement member that engages the first end of the first stage filter. The body portion of the cover can also be formed from various materials such as a plastic material. In non-limiting embodiments, the body portion of the cover is transparent.

In non-limiting embodiments, an inside portion of the opening at the first end of the cover is threaded to receive and engage a threaded outside portion of the second end of the fluid transfer cap. In non-limiting embodiments, the fluid outlet comprises: an extension member that extends out from a side of the annular skirt; and an open channel formed through the extension member where fluid exits the multi-stage filter.

In non-limiting embodiments, the openings of the first stage filter can, for example, have a size within a range of from 1000 microns to 10 microns, such as within a range of from 1000 microns to 1 micron. The openings of the second stage filter can, for example, have a size within a range of from less than 1000 microns to 0.5 micron, such as within a range of from 500 microns to 0.1 micron.

In non-limiting embodiments, the cover, first stage filter, and second stage filter are each cylindrically shaped. The first end of the cover can also have a wider circumference than the body and second end of the cover.

In some non-limiting embodiments, the first stage filter and second stage filter are each independently formed from a metal material comprising the plurality of openings. The body of the second stage filter may further have a support member placed between sections of the metal material.

In non-limiting embodiments, provided is a multi-stage filter system that includes: (a) a pump; and (b) a multi-stage filter in fluid communication with the pump. The multi-stage filter system can have one multi-stage filter, or, alternatively, the multi-stage filter system can have at least two multi-stage filters.

In non-limiting embodiments, when at least two multi-stage filters are used, the fluid inlet of the fluid transfer cap of the first multi-stage filter is in fluid communication with the pump and the fluid outlet of the fluid transfer cap of the first multi-stage filter is in fluid communication with the fluid inlet of the fluid transfer cap of the second multi-stage filter. The surface having water formed thereover can form at least part of a cover placed over a body of water, a boat, or a vehicle.

In non-limiting embodiments, provided is a method of filtering water that includes: (i) pumping unfiltered water into a multi-stage filter as previously described; (ii) filtering water through the plurality of openings of the first stage filter positioned inside the second stage filter; (iii) filtering water through the plurality of openings of the second stage filter; and (iv) distributing filtered water out of the cover of the base and through the fluid outlet of the fluid transfer cap. The method may further include filtering the water produced in step (iv) through a second multi-stage filter.

Further non-limiting embodiments or aspects are set forth in the following clauses:

Clause 1: A multi-stage filter for filtering and transferring fluids comprising:
(1) a filtering base comprising:
(i) a cover comprising a first end having an opening, a second closed end opposite the first end, a body portion that extends between the first end and second end, and a housing formed within the body portion;
(ii) a second stage filter positioned inside the housing of the cover, the second stage filter comprising a first end, a second end opposite the first end, a body portion that extends between the first end and second end, and a housing formed within the body portion, the body portion of the second stage filter comprising a plurality of openings;
(iii) a first stage filter positioned inside the housing of the second stage filter, the first stage filter comprising a body portion comprising a plurality of openings having a size that is larger than the size of the openings of the second stage filter; and
(2) a fluid transfer cap that attaches to the first end of the cover of the filter base, the fluid transfer cap comprising:
(i) a first closed end;
(ii) a second end having an opening that is positioned opposite the first end;
(iii) an annular skirt that extends between the first and second ends;
(iv) an annular shaped barrier member positioned inside the annular skirt and spaced apart from the annular skirt, the annular shaped barrier member comprising a housing and an outlet located at an end opposite the first end of the cap;
(v) a fluid inlet comprising (a) an extension member that extends through a side of the annular skirt to the annular shaped barrier member, and (b) an open channel formed through the extension to allow fluids to flow into the housing of the annular shaped barrier member; and
(vi) a fluid outlet that receives and distributes filtered water from the housing of the cover,
wherein, when the cap is attached to the base of the device, the annular shaped barrier member extends into the housing of the first stage filter, and the first stage filter and second stage filter engage the base and fluid transfer cap so water flows through the plurality of openings to the fluid outlet.

Clause 2: The multi-stage filter of clause 1, wherein an outer surface of the annular shaped barrier member comprises an engagement member that engages the first end of the first stage filter.

Clause 3: The multi-stage filter of clause 1 or 2, wherein the body portion of the cover is formed from a plastic material.

Clause 4: The multi-stage filter of any of clauses 1-3, wherein the body portion of the cover is transparent.

Clause 5: The multi-stage filter of any of clauses 1-4, wherein an inside portion of the opening at the first end of the cover is threaded to receive and engage a threaded outside portion of the second end of the fluid transfer cap.

Clause 6: The multi-stage filter of any of clauses 1-5, wherein the fluid outlet comprises: an extension member that extends out from a side of the annular skirt; and an open channel formed through the extension member where fluid exits the multi-stage filter.

Clause 7: The multi-stage filter of any of clauses 1-6, wherein the openings of the first stage filter have a size within a range of from 1000 microns to 1 micron.

Clause 8: The multi-stage filter of any of clauses 1-7, wherein the openings of the second stage filter have a size within a range of from less than 1000 microns to 0.5 micron.

Clause 9: The multi-stage filter of any of clauses 1-8, wherein the first end of the cover has a wider circumference than the body and second end of the cover.

Clause 10: The multi-stage filter of any of clauses 1-9, wherein the first stage filter and second stage filter are each independently formed from a metal material comprising the plurality openings.

Clause 11: The multi-stage filter of any of clauses 1-10, wherein the body of the second stage filter further comprises support members placed between sections of the metal material.

Clause 12: The multi-stage filter of any of clauses 1-11, wherein the cover, first stage filter, and second stage filter are each cylindrically shaped.

Clause 13: A multi-stage filter system comprising: (a) a pump; and (b) a multi-stage filter according to any of clauses 1-12 that is in fluid communication with the pump.

Clause 14: The multi-stage filter system of clause 13, wherein the multi-stage filter system only has one multi-stage filter according to any of clauses 1-12.

Clause 15: The multi-stage filter system according to clause 13 or 14, wherein the multi-stage filter system comprises at least two multi-stage filters according to any of clauses 1-12.

Clause 16: The multi-stage filter system of any of clauses 13-15, wherein the fluid inlet of the fluid transfer cap of the first multi-stage filter is in fluid communication with the pump and the fluid outlet of the fluid transfer cap of the first multi-stage filter is in fluid communication with the fluid inlet of the fluid transfer cap of the second multi-stage filter.

Clause 17: A method of filtering water comprising: (i) pumping unfiltered water into a multi-stage filter according to any of clauses 1-12; (ii) filtering water through the plurality of openings of the first stage filter positioned inside the second stage filter; (iii) filtering water through the plurality of openings of the second stage filter; and (iv) distributing filtered water out of the cover of the base and through the fluid outlet of the fluid transfer cap.

Clause 18: The method of clause 18, further comprising filtering the water produced in step (iv) through a second multi-stage filter according to any of clauses 1-12.

DETAILED DESCRIPTION

Figure 1:
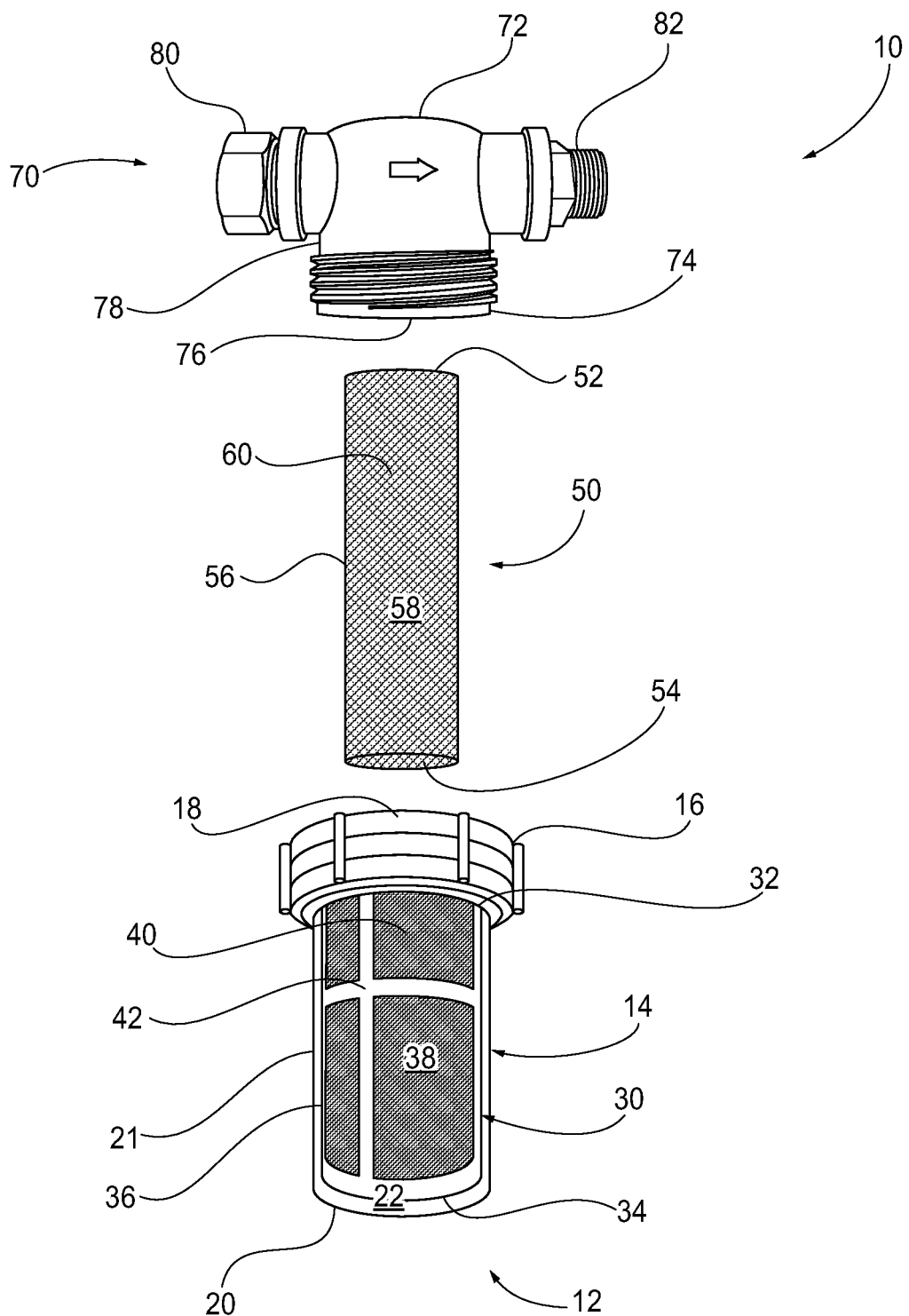
FIG. 1 is a perspective partial exploded view of a multi-stage filter according to non-limiting embodiments of the present disclosure.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

In non-limiting embodiments, and referring to FIG. 1, provided is a multi-stage filter 10 for filtering and transferring water. FIG. 1 is a partial exploded view illustrating the various components of the multi-stage filter 10. As shown in FIG. 1, the multi-stage filter 10 comprises a base 12 having a cover 14. The cover 14 comprises a first end 16 having an opening 18, a second closed end 20 opposite the first end 16, a body portion 21 that extends between the first end 16 and second end 20. As further shown in FIG. 1, a housing 22 is formed within the body portion 21. The cover 14 can have various shapes and sizes. For example, as shown in FIG. 1, the cover 14 can have a cylindrical shape. The cover 14 is also sized to receive a desired amount of water to be filtered in a particular application, such as being sized to filter water found on covers of water reservoirs (e.g. pool covers or boat covers) or water from various sources including ponds, fish tanks, and the like.

The previously described cover 14 can be formed from various materials. Non-limiting examples of material that can form the cover include, but are not limited to, plastics, metals, and combinations thereof. For instance, the cover 14 can be formed from a plastic material such as acrylics, polystyrene, polyethylene, high density polyethylene, nylon, acrylonitrile butadiene styrene, polystyrene, polypropylene, polycarbonate, copolymers thereof, or combinations thereof. The material that forms the cover 14 can also be transparent. As used herein, the term "transparent" refers to a material, wherein an object beyond the material is at least partially visible to the naked eye when viewed through the material.

As shown in FIG. 1, the base 12 of the multi-stage filter 10 further includes a second stage filter 30 that is positioned into the housing 22 of the cover 14. As used herein, a "second stage filter" refers to a component capable of filtering water and which occurs after a first filtering stage, which is discussed in further detail herein. The second stage filter 30 comprises a first end 32, a second end 34 opposite the first end 32, a body portion 36 that extends between the first end 32 and second end 34, and a housing 38 formed within the body portion 36. Referring to FIG. 1, the body portion 36 of the second stage filter 30 comprises a plurality of openings 40. The size of the plurality of openings 40 can be selected within a range of from less than 1000 microns to 0.5 micron, such as within a range of from 500 microns to 0.1 micron.

The second stage filter 30 can be made from various materials. Non-limiting examples of suitable materials include metal materials, such as rust-proof based metal materials. For instance, the second stage filter 30 can be made from aluminum, stainless steel, ceramics, and combinations thereof.

Referring to FIG. 1, the body portion 36 of the second stage filter 30 can also have support members 42 that form sectioned areas throughout the body portion 36. The support members 42 help support and secure the structure of the body portion 36, such as by preventing the body portion 36 from bending and/or stretching. The support members 42 can be formed from various materials such as, for example, a rubber material and/or a plastic material.

Referring to FIG. 1, the second stage filter 30 can have the same shape as the cover 14. For example, the cover 14 and second stage filter 30 can both have a cylindrical shape. Alternatively, the second stage filter 30 can have a different shape than the shape of the cover 14.

As shown in FIG. 1, the multi-stage filter 10 further includes a first stage filter 50 that is to be positioned within the housing 38 of the second stage filter 30. As used herein, a "first stage filter" refers to a component capable of filtering water before any other filtering stage. The first stage filter 50 comprises a first end 52, a second end 54 opposite the first end 52, a body portion 56 that extends between the first end 52 and second end 54, and a housing 58 formed within the body portion 56. Referring to FIG. 1, the body portion 56 of the first stage filter 50 comprises a plurality of openings 60 having a size that is larger than the size of the openings 40 of the second stage filter 30. The size of the plurality of openings 60 of the first stage filter 50 can be selected within a range of from 1000 microns to 10 microns, such as within a range of from 1000 microns to 1 micron.

The first stage filter 50 can be made from various materials including any of the materials used to make the second stage filter 30, such as rust-proof based metal materials. The first stage filter 50 can be made from the same materials as the second stage filter 30, or, alternatively, from different materials than the materials that form the second stage filter 30. For instance, the first stage filter 50 and the second stage filter 30 can both be made from aluminum.

As previously described, the body portion 36 of the second stage filter 30 can also have support members 42 that form sectioned areas throughout the body portion 36. The first stage filter 50 can also have the same support members 42 previously described. Alternatively, the second stage filter 30 and/or first stage filter 50 can be free of such support members 42.

Figure 2:
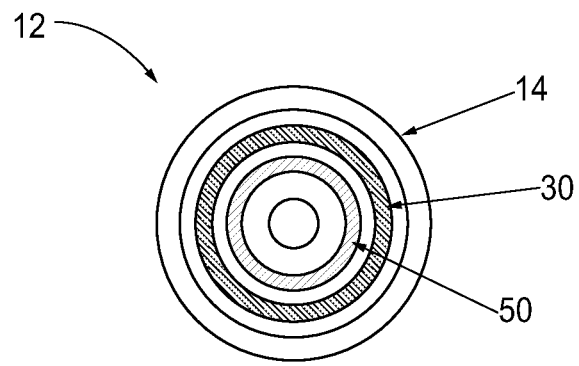
FIG. 2 is a bottom view of the filter base of a multi-stage filter according to non-limiting embodiments of the present disclosure.

The first stage filter 50 can also have the same shape as the second stage filter 30 and/or the cover 14. For example, the cover 14, second stage filter 30, and first stage filter 50 can all have a cylindrical shape. FIG. 2, illustrates a bottom view of the filter base 12 in which the cover 14, second stage filter 30, and first stage filter 50 all have a cylindrical shape. Alternatively, the first stage filter 50 can have a different shape than the second stage filter 30 and/or cover 14.

The base 12 of the multi-stage filter 10 can also include additional filter stages. For example, the multi-stage filter 10 can include a third stage filter or more. It is appreciated that the additional stage filters can be the same as the previously described first stage filter 50 and/or second stage filter 30. Further, the first and second stage filters 50 and 30 can be positioned inside the additional stage filters.

As further shown in FIG. 1, the multi-stage filter 10 also includes a fluid transfer cap 70 that attaches to the first end 16 of the cover 14 of the filter base 12. The fluid transfer cap 70 comprises a first closed end 72 and a second end 74 having an opening 76 that is positioned opposite the first closed end 72. As further shown in FIG. 1, the fluid transfer cap 70 has an annular skirt 78 that extends between the first and second ends 72 and 74. It is appreciated that the annular skirt 78 extends around the peripheral edge of the first end 72 of the fluid transfer cap 70.

Figure 3:
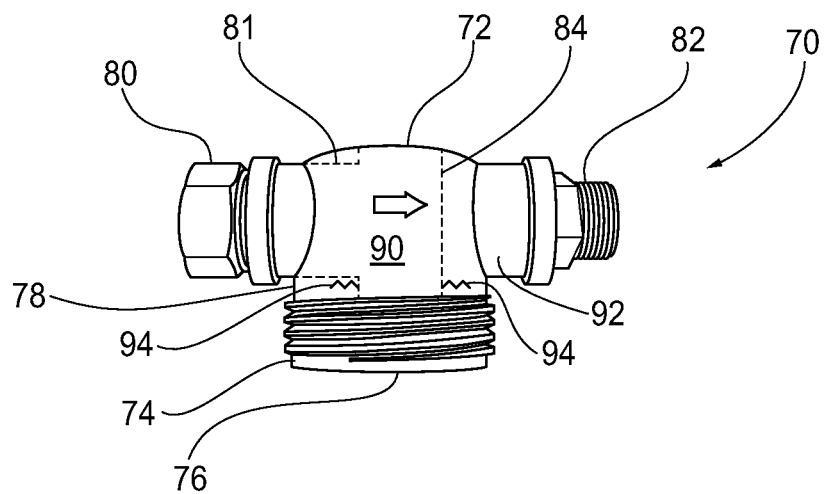
FIG. 3 is a cross-sectional view of a fluid transfer cap of a multi-stage filter according to non-limiting embodiments of the present disclosure.

Referring again to FIG. 1, the fluid transfer cap 70 further includes a fluid inlet 80 for receiving liquids, such as unfiltered water, and a fluid outlet 82 for distributing the filtered liquids out of the multi-stage filter 10. As shown in FIG. 3, the fluid inlet 80 can include an extension member 81 that extends through a side of the annular skirt 78. The extension member 81 can extend through a side of the annular skirt 78 to an annular shaped barrier member 84 positioned inside and spaced apart from the annular skirt 78. The annular shaped barrier member 84 positioned inside the annular skirt 78 extends down from the first closed end 72 of the cap 70 and includes an outlet located at an end opposite the first end 72 of the cap 70. The extension member 81 comprises an open channel that extends through the extension member 81 and through a side of the annular shaped barrier member 84 to allow fluids to flow into the housing 90 of the annular shaped barrier member 84. It is appreciated that the fluids flowing into the housing 90 of the annular shaped barrier member 84 are forced down toward the second end 74 of the fluid transfer cap 70 where the fluids flow out of the opening 76.

The fluid transfer cap 70 further includes a fluid outlet 82 that receives and distributes filtered water from the housing 22 of the cover 14. The fluid outlet 82 can comprise a second extension member 92 that extends out from a side of the annular skirt 78. The fluid outlet 82 can be positioned at an opposite side of the annular skirt 78 from the fluid inlet 80.

When the fluid transfer cap 70 is attached to the base 12 of the device 10, the annular shaped barrier member 84 extends into the housing 58 of the first stage filter 50. In non-limiting embodiments, the fluid transfer cap 70 can attach to the base 12 of the device 10 in a threaded engagement. For instance, an inside portion of the opening 18 at the first end 16 of the cover 14 is threaded to receive and engage a threaded outside portion of the second end 74 of the fluid transfer cap 70. In non-limiting embodiments, the first end 16 of the cover 14 has a wider circumference than the body 21 and second end 20 of the cover 14. It will be appreciated that this arrangement can form a ledge that the cap 70 can sit on and form a seal when attached to the base 12.

The first stage filter 50 and second stage filter 30 engage the base 12 and fluid transfer cap 70 when the cap 70 is attached to the base 12 so water flows through the plurality of openings 40, 60 to the fluid outlet 82. For example, fluids entering the fluid inlet 80 are forced into and through the first stage filter 50 by the annular shaped barrier member 84 that extends into a portion of the housing 58 of the first stage filter 50. Fluids leaving the first stage filter 50 then enter the second stage filter 30 and are forced through the openings 40 of the second stage filter 30 by engaging the first and second ends 32, 34 with the base 12 of the cover 14 and the fluid transfer cap 70. In non-limiting embodiments, as shown in FIG. 3, the first and second stage filters 50, 30 can engage one or more engagement members 94, such as spaced apart/divided lips, flanges, or ledges (e.g. in the shape of an "M" or double "M"), such as formed on an outer surface of the annular shaped barrier member 84 that is positioned inside the annular skirt 78 of the fluid transfer cap 70. The first and second stage filters 50, 30 can also engage two flanges, one on either side of the filter housing 22, pinching it to seal. Sealing members, such as O-rings, can also be utilized.

The multi-stage filter 10 can also comprise additional filters such as a third or fourth stage filter. The additional filters can be formed from the same materials as the first and second stage filters 50, 30. Alternatively, the additional filters can be formed from different materials as the first and second stage filters 50, 30.

The multi-stage filter 10 of the present disclosure can also be cleaned and reused. For instance, the cover 14, the first and second stage filters 50, 30, and the fluid transfer cap 70 can be separated, cleaned, and then reassembled for further use. It will be appreciated that cleaning and reusing the multi-stage filters 10 saves costs and time required for buying and replacing the filters 10.

Figure 4:
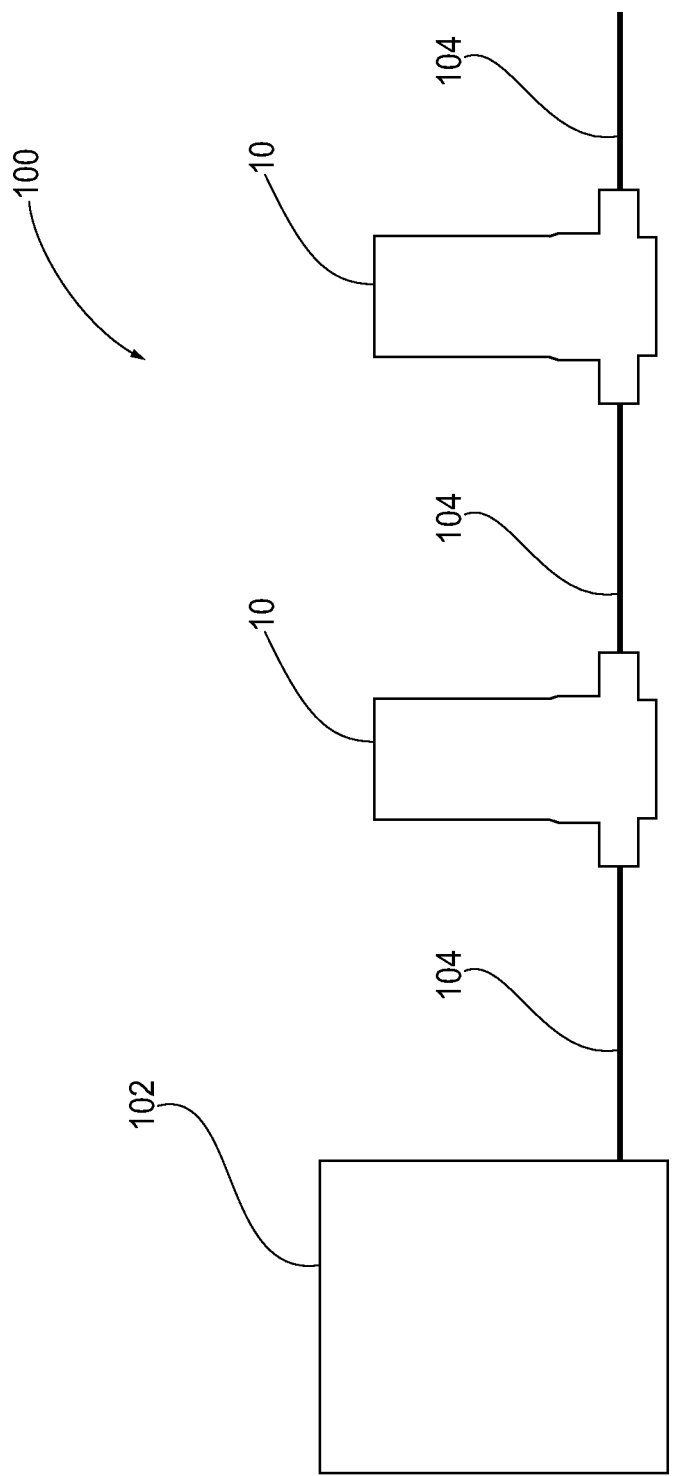
FIG. 4 is a schematic view of a multi-stage filter system according to non-limiting embodiments of the present disclosure.

The present disclosure is also directed to a multi-stage filter system 100. As shown in FIG. 4, the system 100 includes a pump 102 and a multi-stage filter 10 as previously described in fluid communication with the pump 102. The pump 102 can be in fluid communication with the multi-stage filter 10 through a conduit 104 such as a hose or tube. In non-limiting embodiments, the multi-stage filter system 100 only has one multi-stage filter 10. Alternatively, the multi-stage filter system 100 comprises at least two multi-stage filters 10 (i.e. two or more multi-stage filters 10). When two or more multi-stage filters 10 are used, the filters 10 can be the same or different from each other. Further, when two or more multi-stage filters 10 are used, the fluid inlet 80 of the fluid transfer cap 70 is in fluid communication with the pump 102 and the fluid outlet 82 of the fluid transfer cap 70 is in fluid communication with the fluid inlet 80 of the fluid transfer cap 70 of the second multi-stage filter.

The multi-stage filter system 100 can be placed in various areas to filter and remove fluids such as water. For instance, the multi-stage filter system 100 can be placed on top of a surface having water formed over at least a portion of the surface such as, for example, the top surface of a cover (e.g. a pool, hot tub, etc.), a boat, or a vehicle. The multi-stage filter system 100 can also be placed under a surface or directly into a source of fluids to filter and remove fluids.

The present disclosure is further directed to a method of filtering water. The method can include (i) pumping unfiltered water into a multi-stage filter 10 as previously described; (ii) filtering water through the plurality of openings 60 of the first stage filter 50 positioned inside the second stage filter 30; (iii) filtering water through the plurality of openings 40 of the second stage filter 30; and (iv) distributing filtered water out of the cover 14 of the base 12 and through the fluid outlet 82 of the fluid transfer cap 70. The method can further include filtering the water produced in step (iv) through at least a second multi-stage filter 10 when multiple filters 10 are used.

It was found that the multi-stage filters 10 and system 100 described herein provides an effective alternative for removing debris and fluids (e.g. water), such as from pool and boat covers. The multi-stage filters 10 and system 100 described herein also filters water for reuse, for example to be incorporated into a pool.

Whereas particular embodiments of this disclosure have been described above for purposes of illustration, it will be evident to those skilled in the art that numerous variations of the details of the present disclosure may be made without departing from the disclosure as defined in the appended claims.

What is claimed is:

1. A multi-stage filter for filtering and transferring fluids comprising:
   (1) a filtering base comprising:
      (i) a cover comprising a first end having an opening, a second closed end opposite the first end, a body portion that extends between the first end and second end, and a housing formed within the body portion;
      (ii) a second stage filter positioned inside the housing of the cover, the second stage filter comprising a first end, a second end opposite the first end, a body portion that extends between the first end and second end, and a housing formed within the body portion, the body portion of the second stage filter comprising a plurality of openings;
      (iii) a first stage filter positioned inside the housing of the second stage filter, the first stage filter comprising a body portion comprising a plurality of openings having a size that is larger than the size of the openings of the second stage filter; and
   (2) a fluid transfer cap that attaches to the first end of the cover of the filter base, the fluid transfer cap comprising:
      (i) a first closed end;
      (ii) a second end having an opening that is positioned opposite the first end;
      (iii) an annular skirt that extends between the first and second ends;
      (iv) an annular shaped barrier member positioned inside the annular skirt and spaced apart from the annular skirt, the annular shaped barrier member comprising a housing and an outlet located at an end opposite the first end of the cap;
      (v) a fluid inlet comprising an extension member that extends through a side of the annular skirt to the annular shaped barrier member, and an open channel formed through the extension member to allow fluids to flow into the housing of the annular shaped barrier member; and
      (vi) a fluid outlet that receives and distributes filtered water from the housing of the cover,
   wherein, when the cap is attached to the base, the annular shaped barrier member extends into the housing of the first stage filter, and the first stage filter and second stage filter engage the base and fluid transfer cap so water flows through the plurality of openings to the fluid outlet, and
   wherein the first stage filter and second stage filter are each independently formed from a metal material comprising the plurality openings.

2. The multi-stage filter of claim 1, wherein an outer surface of the annular shaped barrier member comprises an engagement member that engages the first end of the first stage filter.

3. The multi-stage filter of claim 1, wherein the body portion of the cover is formed from a plastic material.

4. The multi-stage filter of claim 3, wherein the body portion of the cover is transparent.

5. The multi-stage filter of claim 1, wherein an inside portion of the opening at the first end of the cover is threaded to receive and engage a threaded outside portion of the second end of the fluid transfer cap.

6. The multi-stage filter of claim 1, wherein the fluid outlet comprises: an extension member that extends out from a side of the annular skirt; and an open channel formed through the extension member where fluid exits the multi-stage filter.

7. The multi-stage filter of claim 1, wherein the openings of the first stage filter have a size within a range of from 1000 microns to 1 microns.

8. The multi-stage filter of claim 1, wherein the openings of the second stage filter have a size within a range of from less than 1000 microns to 0.5 micron.

9. The multi-stage filter of claim 1, wherein the first end of the cover has a wider circumference than the body and second end of the cover.

10. The multi-stage filter of claim 1, wherein the body of the second stage filter further comprises support members placed between sections of the metal material.

11. The multi-stage filter of claim 1, wherein the cover, first stage filter, and second stage filter are each cylindrically shaped.

12. A multi-stage filter system comprising:
   (a) a pump; and
   (b) a multi-stage filter according to claim 1 that is in fluid communication with the pump.

13. The multi-stage filter system of claim 12, wherein the multi-stage filter system only has one multi-stage filter according to claim 1.

14. The multi-stage filter system of claim 12, wherein the multi-stage filter system comprises at least two multi-stage filters according to claim 1.

15. The multi-stage filter system of claim 14, wherein the fluid inlet of the fluid transfer cap of the first multi-stage filter is in fluid communication with the pump and the fluid outlet of the fluid transfer cap of the first multi-stage filter is in fluid communication with the fluid inlet of the fluid transfer cap of the second multi-stage filter.

16. A method of filtering water comprising:
   (i) pumping unfiltered water into a multi-stage filter according to claim 1;
   (ii) filtering water through the plurality of openings of the first stage filter positioned inside the second stage filter;
   (iii) filtering water through the plurality of openings of the second stage; and
   (iv) distributing filtered water out of the cover of the base and through the fluid outlet of the fluid transfer cap.

17. The method of claim 16, further comprising filtering the water produced in step (iv) through a second multi-stage filter according to claim 1.

* * * * *